(12) United States Patent
Hoshide

(10) Patent No.: US 11,760,478 B2
(45) Date of Patent: Sep. 19, 2023

(54) FLYING ROBOT

(71) Applicant: THK CO., LTD., Tokyo (JP)

(72) Inventor: Kaoru Hoshide, Tokyo (JP)

(73) Assignee: THK CO., LTD., Tokyo (JP)

( * ) Notice: Subject to any disclaimer, the term of this patent is extended or adjusted under 35 U.S.C. 154(b) by 515 days.

(21) Appl. No.: 16/978,005

(22) PCT Filed: Mar. 5, 2019

(86) PCT No.: PCT/JP2019/008627
§ 371 (c)(1),
(2) Date: Sep. 3, 2020

(87) PCT Pub. No.: WO2019/172253
PCT Pub. Date: Sep. 12, 2019

(65) Prior Publication Data
US 2021/0070438 A1 Mar. 11, 2021

(30) Foreign Application Priority Data

Mar. 9, 2018 (JP) .............................. 2018-042960

(51) Int. Cl.
*B60F 5/02* (2006.01)
*B64C 37/00* (2006.01)
(Continued)

(52) U.S. Cl.
CPC .......... *B64C 39/024* (2013.01); *B25J 9/1679* (2013.01); *B25J 19/005* (2013.01); *B60F 5/02* (2013.01);
(Continued)

(58) Field of Classification Search
CPC ...... B64C 25/001; B64C 27/00; B25J 9/1679; B25J 19/005; B60F 5/02; B64D 1/22;
(Continued)

(56) References Cited

U.S. PATENT DOCUMENTS

2002/0060267 A1* 5/2002 Yavnai ................... B62D 57/04
180/7.4
2016/0236346 A1* 8/2016 Lee ........................... B25J 9/10
(Continued)

FOREIGN PATENT DOCUMENTS

CN 107662661 A 2/2018
JP 2002-200990 A 7/2002
(Continued)

OTHER PUBLICATIONS

Office Action dated Nov. 9, 2021, issued in counterpart JP application No. 2018-042960, with English translation. (8 pages).
(Continued)

*Primary Examiner* — Tye William Abell
(74) *Attorney, Agent, or Firm* — WHDA, LLP

(57) ABSTRACT

A flying robot comprising: a flying body unit; a propulsion portion comprising a plurality of propulsion units configured to cause propulsion to occur by driving rotor blades, the plurality of propulsion units being provided on the flying body unit; a working body unit; a manipulator unit configured to be capable of executing predetermined work and comprising one or more work manipulators provided on the working body unit; and connection units provided on the working body unit and the flying body unit so as to enable the flying body unit to be connected with and disconnected from the working body unit; wherein the flying robot executes the predetermined work by the work manipulators in a state in which the working body unit and the flying body unit are connected at the connection units. The flying robot is caused to execute a wide range of content of work as far as possible.

4 Claims, 8 Drawing Sheets

(51) Int. Cl.
  *B64C 39/02*   (2023.01)
  *B25J 9/16*    (2006.01)
  *B25J 19/00*   (2006.01)
  *B64C 25/00*   (2006.01)
  *B64D 1/22*    (2006.01)
  *G05D 1/02*    (2020.01)
  *G05D 1/10*    (2006.01)
  *B64U 10/13*   (2023.01)
  *B64U 50/34*   (2023.01)
  *B64U 101/60*  (2023.01)

(52) U.S. Cl.
  CPC ............ *B64C 25/001* (2013.01); *B64C 37/00* (2013.01); *B64D 1/22* (2013.01); *G05D 1/021* (2013.01); *G05D 1/101* (2013.01); *B64U 10/13* (2023.01); *B64U 50/34* (2023.01); *B64U 2101/60* (2023.01); *G05D 2201/0217* (2013.01)

(58) Field of Classification Search
  CPC .... B64U 10/13; B64U 50/34; B64U 2101/60; G05D 1/021; G05D 1/101; G05D 2201/0217
  See application file for complete search history.

(56) References Cited

U.S. PATENT DOCUMENTS

2017/0210469 A1\* 7/2017 Piasecki .................. B64C 27/22
2019/0202560 A1\* 7/2019 Bosworth ................ B64D 1/00
2019/0314990 A1\* 10/2019 Sugaki ..................... B25J 9/162

FOREIGN PATENT DOCUMENTS

| JP | 2005-225480 A | 8/2005 |
| JP | 2017-202561 A | 11/2017 |
| JP | 2018-000015 A | 1/2018 |
| JP | 2018-034286 A | 3/2018 |
| WO | 2016/193666 A2 | 12/2016 |

OTHER PUBLICATIONS

Office Action dated May 17, 2022, issued in counterpart JP Application No. 2018-042960, with English Translation. (9 pages).
International Search Report dated Jun. 11, 2019, issued in counterpart application No. PCT/JP2019/008627, w/English translation (4 pages).

\* cited by examiner

[Fig. 1]
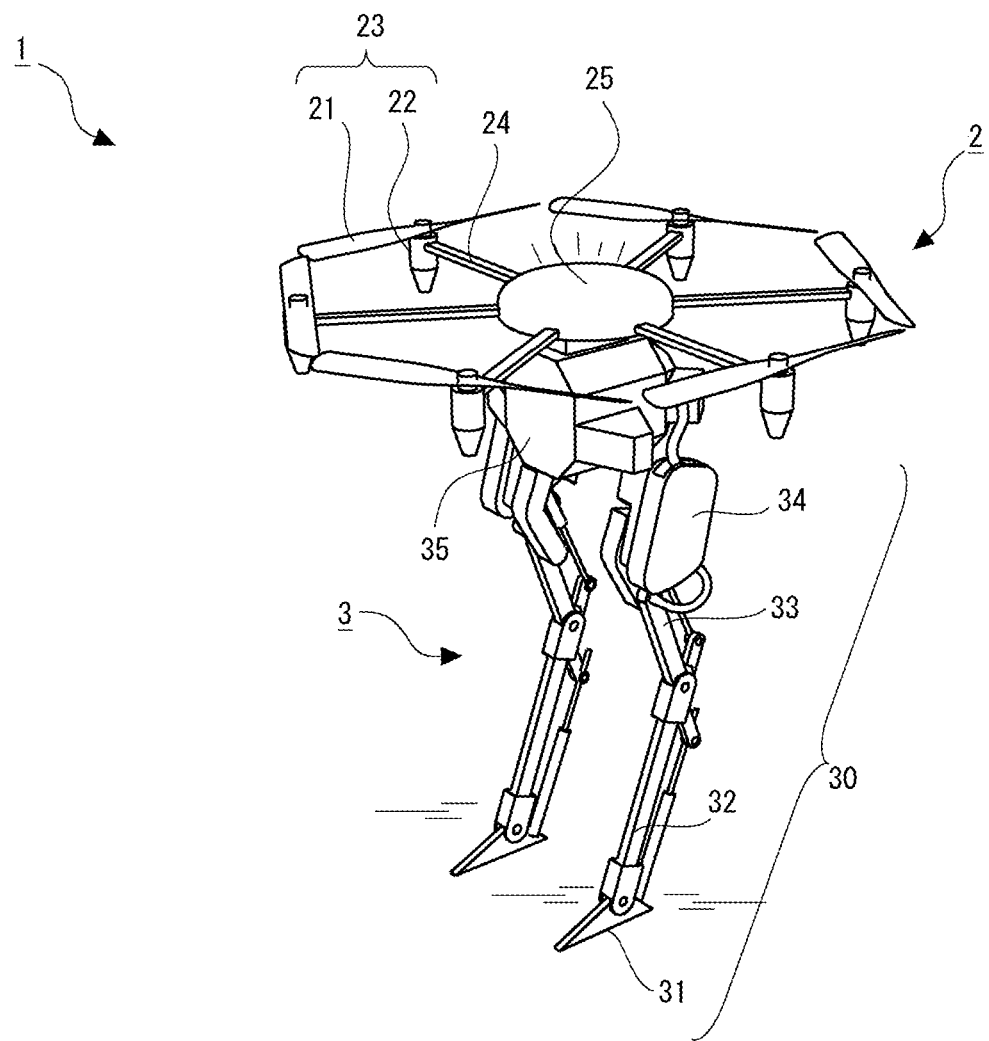

[Fig. 2A]
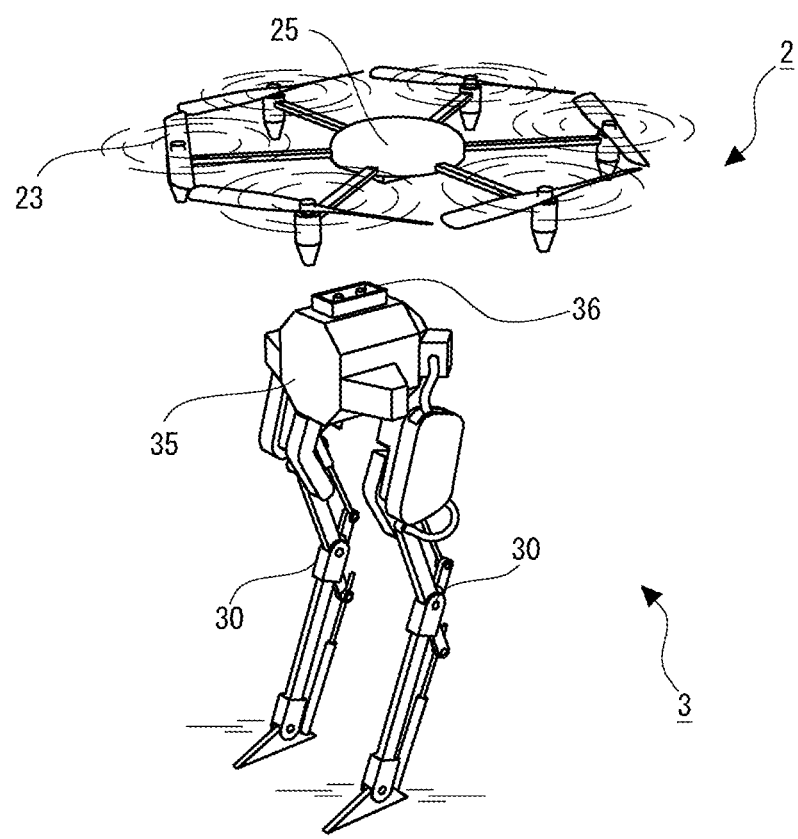

[Fig. 2B]
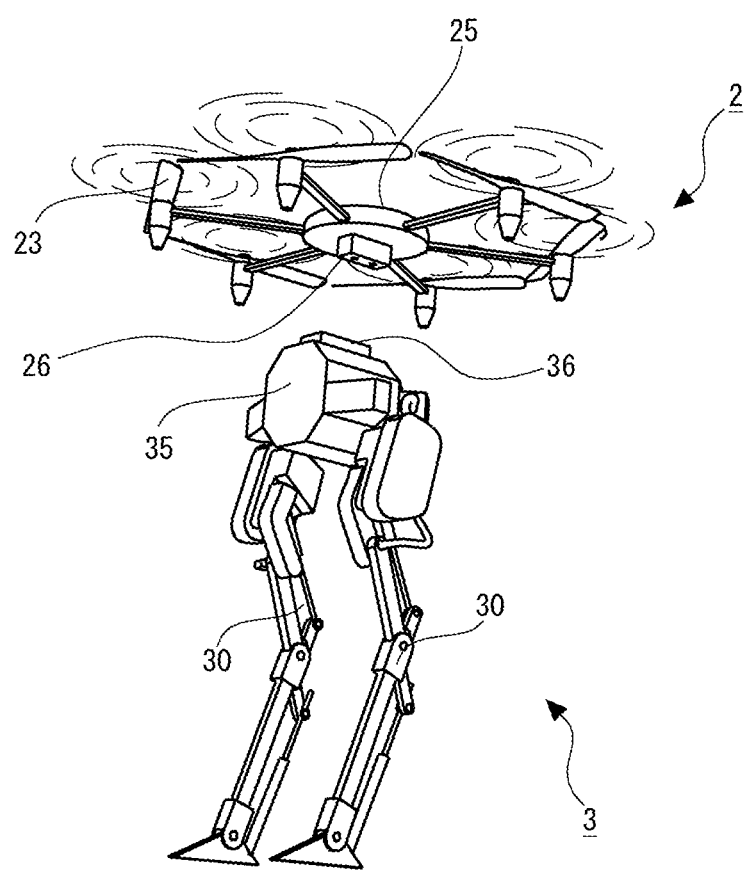

[Fig. 3]
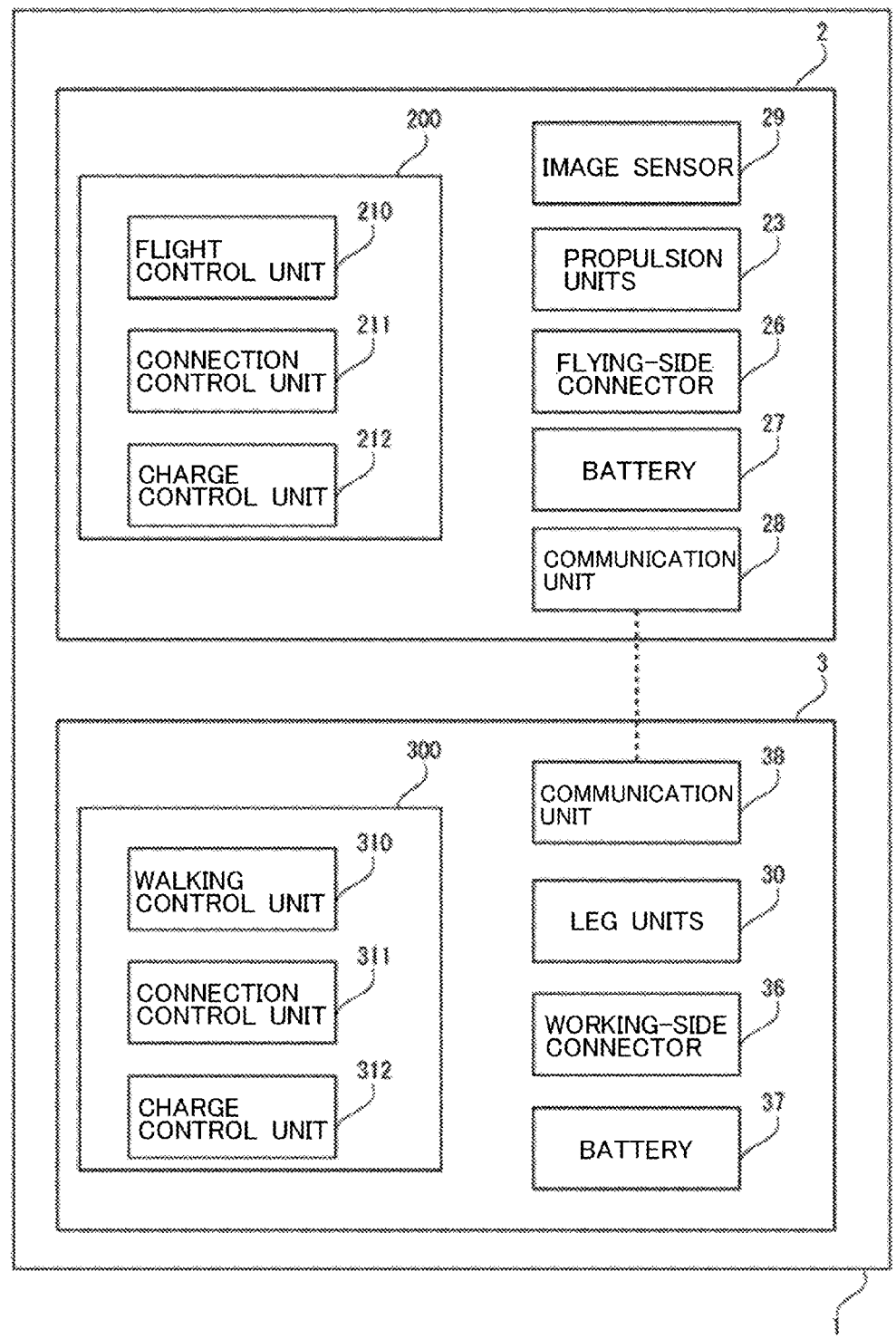

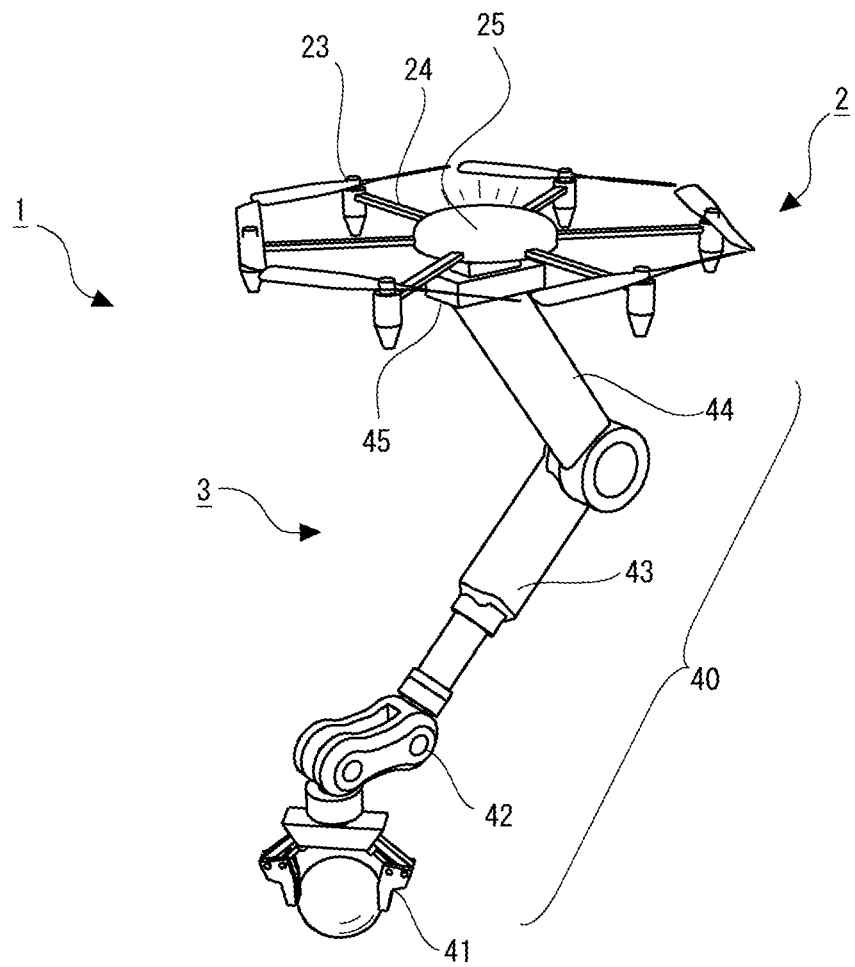
[Fig. 4A]

[Fig. 4B]
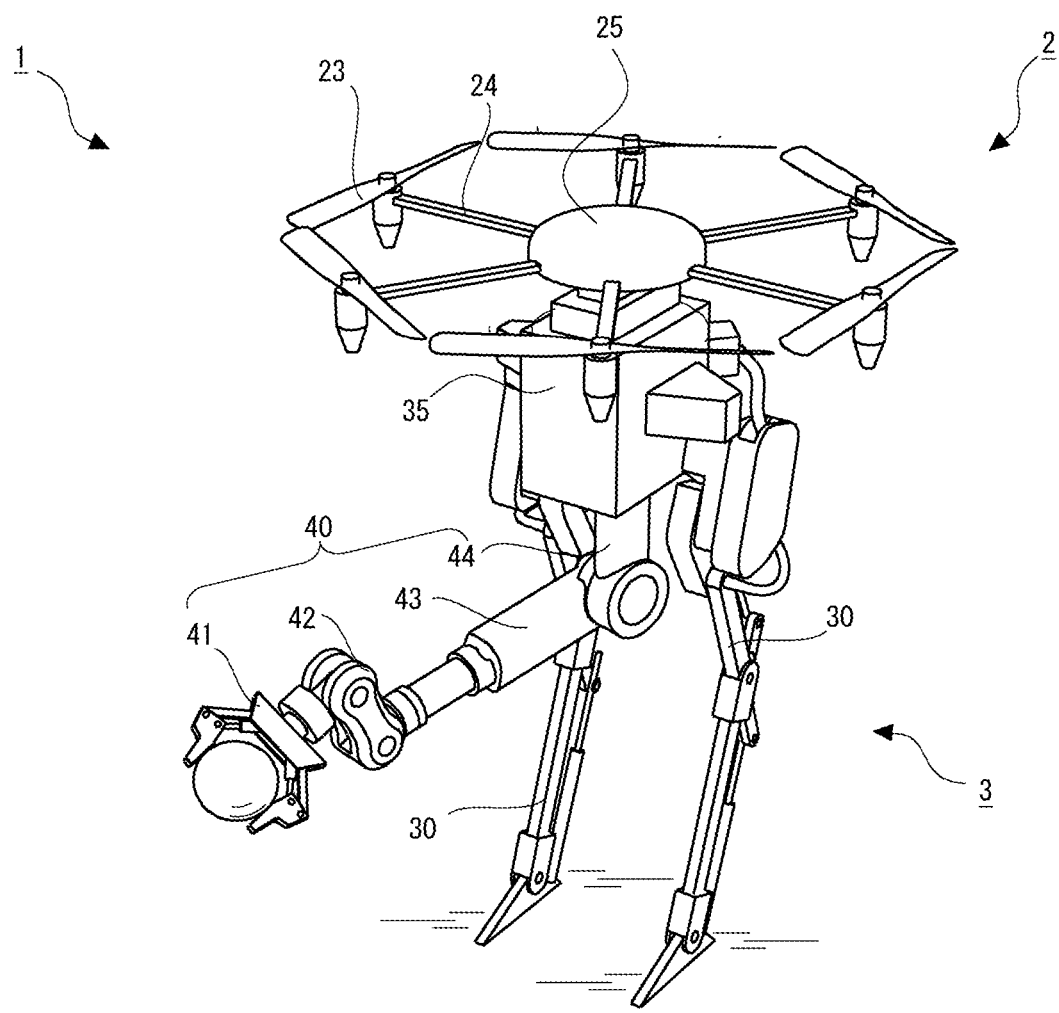

[Fig. 5]
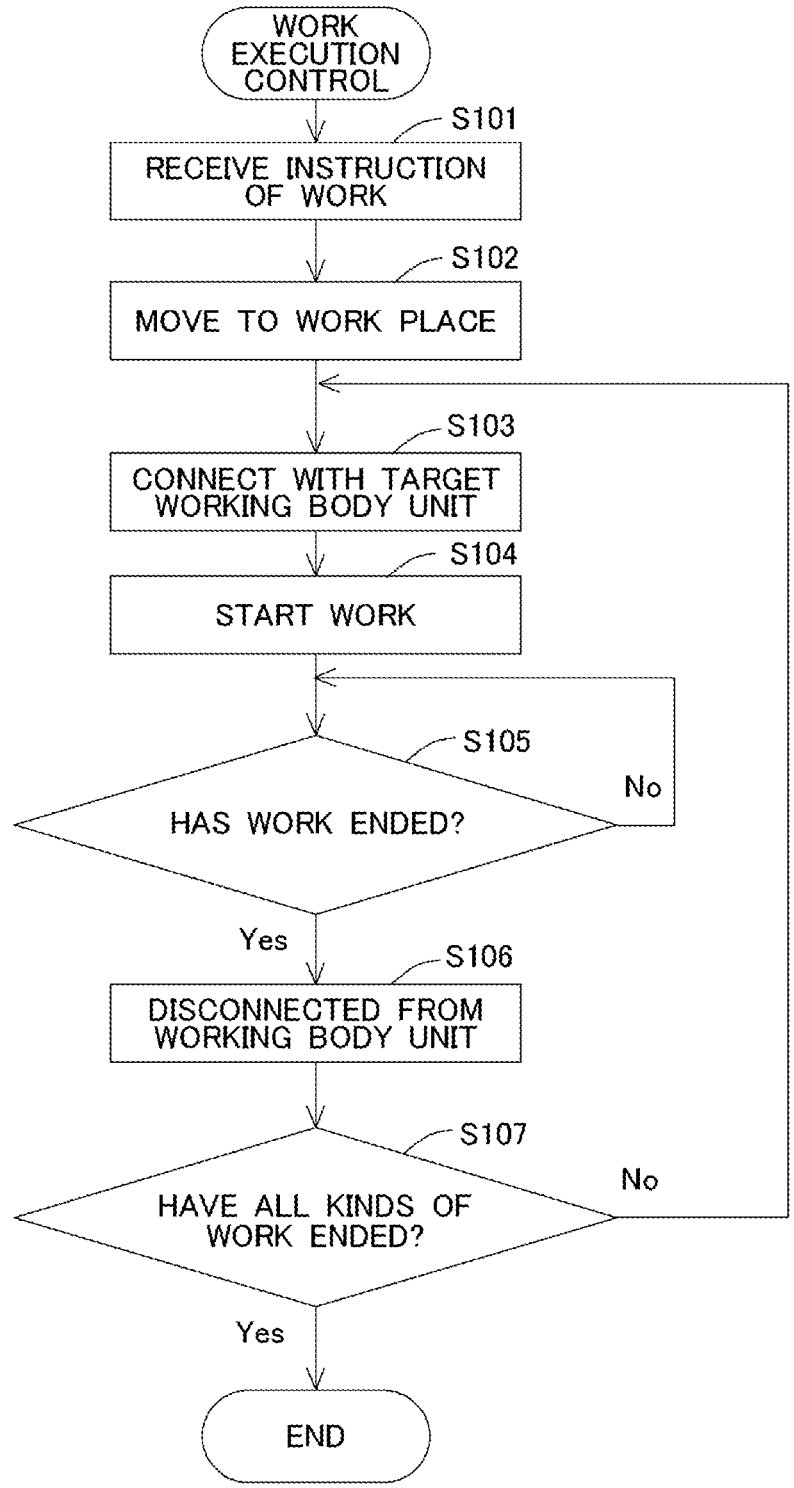

[Fig. 6]
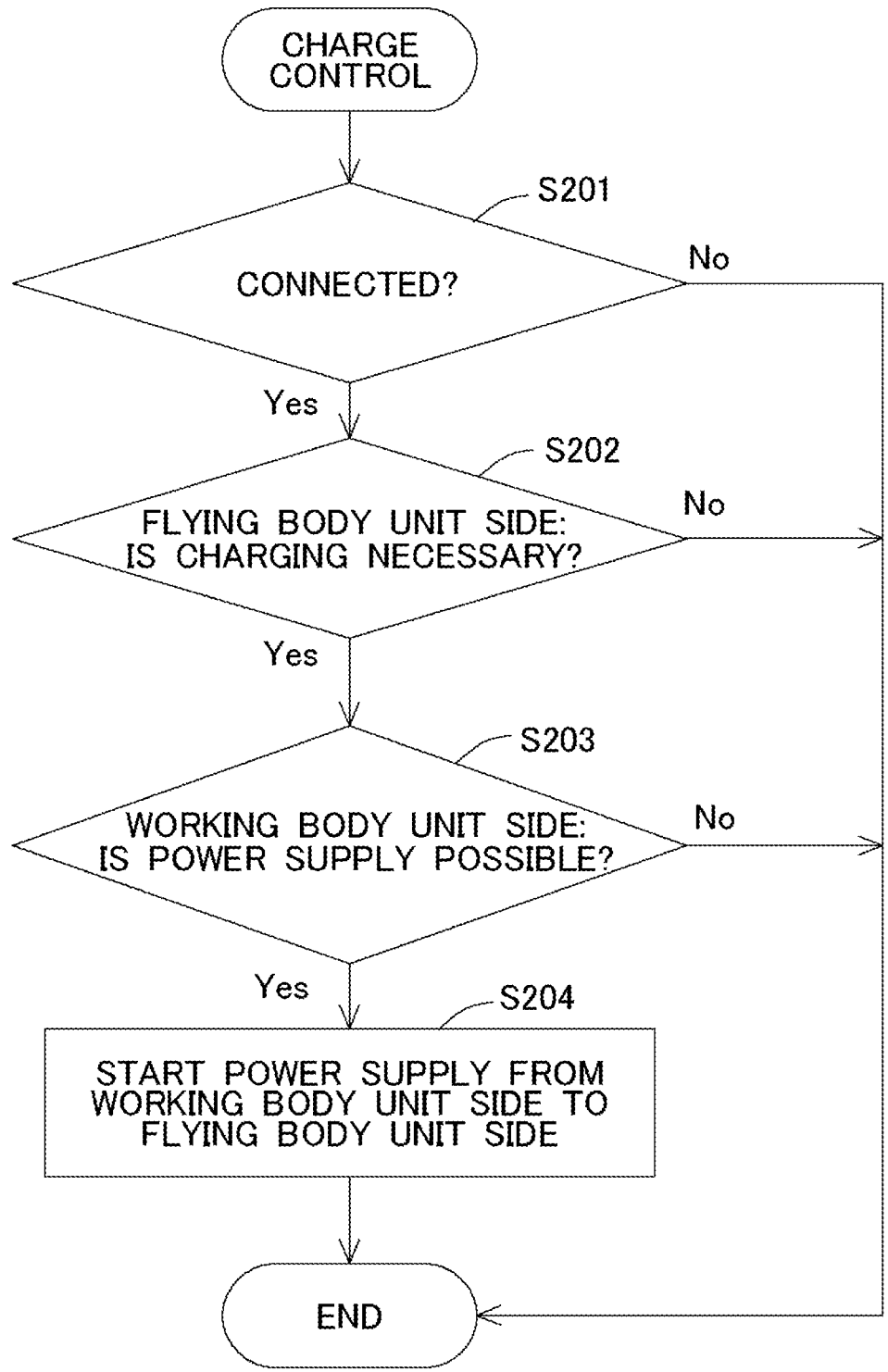

FLYING ROBOT

TECHNICAL FIELD

The present invention relates to a flying robot capable of flying and capable of executing predetermined work.

BACKGROUND ART

Recently, unmanned flying bodies have been used for various purposes, and development thereof has been actively performed. As unmanned flying bodies, a radio-controlled unmanned helicopter and a so-called drone are used. For example, as examples of utilizing a drone for agricultural purposes, spraying of pesticide, observation of growth of agricultural products using a mounted camera, generation of an air flow for protecting agricultural products from frost damage and the like can be given (see, for example, Patent document 1).

Further, development of a flyable robot is also performed by installing an arm or the like to execute predetermined work, on an unmanned flying body so the flyable robot can be widely used not only for the agricultural purposes but also for other purposes. For example, in a technique shown in Patent document 2, a plurality of arms provided on a robot body are provided with propellers that enable the robot to fly. Thereby, the robot can fly, move to an arbitrary place, walk on the ground using the plurality of arms and perform predetermined work. Further, Patent document 3 makes a disclosure to the effect that a flyable robot is configured by attaching very versatile robot hands to a multicopter.

CITATION LIST

Patent Document

[Patent document 1] Japanese Patent Laid-Open No. 2018-000015
[Patent document 2] International Publication No. WO 2016/193666
[Patent document 3] Japanese Patent Laid-Open No. 2017-202561
[Patent document 4] Japanese Patent Laid-Open No. 2002-200990

SUMMARY OF THE INVENTION

Problems to be Solved by the Invention

A main purpose of an unmanned flying body such as a drone is to fly. Therefore, the unmanned flying body itself cannot perform work, and, generally, manipulators such as arms and leg units for performing such work are attached to the unmanned flying body. However, when a manipulator is attached to an unmanned flying body in a prior-art technique, the manipulator is coupled with a body side of the flying body. Therefore, content of work that the unmanned flying body can execute depends on the attached manipulator, and versatility of the content of work by the unmanned flying body is not so high.

When a place where the unmanned flying body performs work by the manipulator and a place where the unmanned flying body starts flying (for example, a storage place of the unmanned flying body) are relatively far away from each other, there is a possibility that, if content of work of the unmanned flying body at the work place is restricted, efficient use of the unmanned flying body is hindered. In other words, in order to enable a wide range of work at a remote area, many types of unmanned flying bodies mounted with manipulators corresponding to the content of work have to be caused to fly, or work time has to be lengthened if the number of unmanned flying bodies is restricted.

The present invention has been made in view of the above problem and relates to a flying robot, which is a flying body mounted with a manipulator for work, and an object is to provide a technique enabling execution of a wide range of content of work as far as possible.

Means for Solving the Problems

In the present invention, in order to solve the above problem, a flying robot of the present invention is configured, being divided in a working body unit side where work manipulators are provided to perform work and a flying body unit side where propulsion units for flying are provided, and is configured so that both can be connected with and disconnected from each other. By this configuration, it is possible to appropriately select a work manipulator corresponding to content of work to configure the flying robot. Therefore, it is possible to adjust the content of work of the flying robot in a wide range as far as possible.

Specifically, the present invention is a flying robot comprising: a flying body unit; a propulsion portion comprising a plurality of propulsion units configured to cause propulsion to occur by driving rotor blades, the plurality of propulsion units being provided on the flying body unit; a working body unit; a manipulator unit configured to be capable of executing predetermined work and comprising one or more work manipulators provided on the working body unit; and connection units provided on the working body unit and the flying body unit so as to enable the flying body unit to be connected with and disconnected from the working body unit. The flying robot executes the predetermined work by the work manipulators in a state in which the working body unit and the flying body unit are connected at the connection units.

Effects of the Invention

It is possible to cause a flying robot, which is a flying body mounted with a manipulator for work, to execute a wide range of content of work as far as possible.

BRIEF DESCRIPTION OF THE DRAWINGS

FIG. 1 is a view illustrating a schematic configuration of a flying robot according to an embodiment;
FIG. 2A is a view illustrating a state of the flying robot illustrated in FIG. 1 in which a flying body unit and a working body unit are separated, the state being seen from above;
FIG. 2B is a view illustrating a state of the flying robot illustrated in FIG. 1 in which the flying body unit and the working body unit are separated, the state being seen from below;
FIG. 3 is a functional block diagram in which functional units formed in the flying robot according to the embodiment are imaged;
FIG. 4A is a first modification of the flying robot according to the embodiment;
FIG. 4B is a second modification of the flying robot according to the embodiment;

FIG. 5 is a flowchart about work execution control executed in the flying robot according to the embodiment; and FIG. 6 is a flowchart about charge control executed in the flying robot according to the embodiment.

MODE FOR CARRYING OUT THE INVENTION

For a flying robot of the present embodiment, propulsion for flight is generated by a plurality of propulsion units provided on a flying body unit side. Each of the propulsion units has a rotor blade, and propulsion of the propulsion unit is decided by the rotor blade being driven to rotate. Preferably, the propulsion of each propulsion unit can be independently controlled. Arrangement of the plurality of propulsion units on the flying body unit can be arbitrarily designed. By balance among the propulsions of propulsion units provided on the flying body unit, flight states (rise, descent, turn and the like) of the flying robot are controlled. All the plurality of propulsion units provided on the flying body unit may be of the same type, or different types of propulsion units may be mixed together.

Furthermore, the flying robot is provided with a working body unit configured separately from the flying body unit. The flying robot is formed by both of the working body unit and the flying body unit. The working body unit is provided with a work manipulator for predetermined work executed by the flying robot. Specifications such as a structure, a shape, and a size of the work manipulator are appropriately designed according to content of predetermined work that the flying robot is requested to execute. For example, if it is requested to grasp a target object as the predetermined work, a structure corresponding to a robot arm that includes an end effector capable of grasping an assumed target object may be adopted as the work manipulator. Alternatively, if it is requested to ground on the ground or walk on the ground as the predetermined work, a structure corresponding to legs capable of supporting a part or all of a walking robot may be adopted as the work manipulator.

The flying robot of the present embodiment is configured so that the working body unit provided with the work manipulator and the flying body unit provided with the propulsion units can be connected and disconnected via connection units. When such a configuration is made, it is possible to selectively connect a working body unit having a work manipulator corresponding to different content of predetermined work to the flying body unit, and, thereby, it is possible to configure a flying robot capable of executing predetermined work corresponding to a wide range of content. By preparing working body units provided with work manipulators corresponding to a plurality of kinds of work content, respectively, and appropriately exchanging a working body unit to which the flying body unit is to be connected via the connection units, it becomes possible to efficiently execute a wide range of work as a flying robot. Preferably, when the working body units are prepared at a work place, the versatility of the flying robot at the work place dramatically increases.

Note that, when predetermined work is executed by the flying robot of the present embodiment, using a work manipulator, propulsion may be generated by the propulsion units, and the flying robot may be flying. Alternatively, the flying robot may be in a state of not flying. In other words, the propulsion units may be driven in a state in which the flying body unit and the working body unit are connected or may be driven in a state in which the flying body unit is separated from the working body unit. In the former case, propulsion by the propulsion units can be reflected on the predetermined work. In the latter case, the propulsion can be reflected on flying movement of the flying body unit.

A specific embodiment of the present invention will be described below based on drawings. Sizes, materials, shapes, relative arrangement and the like of component parts described in the present embodiment are not intended to limit the technical scope of the invention only thereto unless otherwise stated.

Embodiment

Here, a flying robot 1 according to the present embodiment will be described based on FIG. 1 and FIGS. 2A and 2B. The flying robot 1 is configured including a flying body unit 2 and a working body unit 3. First, the flying body unit 2 will be described. The flying body unit 2 has a plurality of propulsion units 23. Note that, though six propulsion units 23 are mounted on the flying body unit 2 in the example illustrated in FIG. 1, the number of mounted propulsion units 23 only has to be two or more and is not limited to six as far as flight of the flying body unit 2 is possible. Each propulsion unit 23 has a propeller 21, which is a rotor blade, and an actuator 22 for driving the propeller 21 to rotate. Though all the propulsion units 23 mounted on the flying body unit 2 are units of the same type, the actuator 22 can be independently controlled in each propulsion unit 23. Therefore, it is possible to appropriately control propulsion obtained by each propulsion unit 23, and, thereby, it becomes possible to appropriately control a flight posture, a flight speed and the like of the flying body unit 2 and the flying robot 1. Note that flight control of the flying body unit and the like by the propulsion units 23 will be described later.

Here, the flying body unit 2 has a flying-side body 25 almost in the center thereof, and the propulsion units 23 are provided via bridges 24 radially extended from the flying-side body 25, on a tip side of the bridges 24. The six propulsion units 23 are arranged at regular intervals on a circumference, with the flying-side body 25 as the center. Further, the flying-side body 25 is mounted with a battery 27 (see FIG. 3) for supplying drive power to the actuator 22 of each propulsion unit 23, and a control device 200 (see FIG. 3) that controls power supply from the battery 27 to the actuator 22 and the like. Details of control about the flying body unit 2 by the control device 200 will be described later.

Next, the working body unit 3 will be described. The working body unit 3 has two leg units 30 corresponding to a work manipulator configured to be capable of executing predetermined work. In the present specification, the work manipulator that the working body unit 3 has is configured to correspond to predetermined work that the flying robot 1 is expected to execute. Therefore, if content of the predetermined work differs, the configuration as a work manipulator basically differs. In the present embodiment, the work manipulator is configured as the leg units 30, and walking work of the flying robot 1 is assumed for the leg units 30 as predetermined work. Note that, though two leg units 30 are provided on the working body unit 3 in the example illustrated in FIG. 1, the number of leg units 30 is not limited to two, and three or more leg units 30 may be provided as far as the walking work as the predetermined work is possible. Further, if grasping work of grasping a target object is assumed as predetermined work, the work manipulator can be configured as an arm unit 40 as illustrated in FIGS. 4A and 4B described later.

Furthermore, the working body unit 3 may have a plurality of types of work manipulators (for example, the leg units 30 and the arm unit 40).

Each leg unit 30 has a grounding unit 31 that grounds when the flying robot 1 walks by walking work, a first link unit 32 that is relatively rotatably connected with the grounding unit 31 via a joint, a second link unit 33 that is relatively rotatably connected with the first link unit 32 via a joint, a hip joint unit 34 that is relatively rotatably connected with the second link unit 33 via a joint, and a plurality of actuators (not illustrated) that drive-control rotation of the joints. A rotation direction of each of these joints is designed according to assumed walking work. As an example, the joint between the grounding unit 31 and the first link unit 32 is configured to be capable of rotating around a roll axis and a pitch axis; and the joint between the first link unit 32 and the second link unit 33 and the joint between the second link unit 33 and the hip joint unit 34 are configured to be capable of rotating around the pitch axis. Note that the configuration of each joint is not limited to such an aspect.

The hip joint unit 34 is relatively rotatably connected with a working-side body 35 that the working body unit 3 has, via a predetermined joint. This predetermined joint is configured to be capable of rotating around a yaw axis. The predetermined joint may also be configured to be capable of rotating around the roll axis and the pitch axis. As for the leg units 30 connected with the working-side body 35, walking work as predetermined work is realized by actuators for driving the joints, which are provided inside the two leg units 30, respectively, being controlled in linkage with each other. Further, when work other than the walking work is assumed for the leg units 30, for example, when contacting a target object or causing external force to work on a target object by one leg unit 30 while supporting the flying robot 1 by the other leg unit 30, the two leg units 30 may be controlled in linkage with each other, or each of the leg units 30 may be independently controlled.

Further, the working-side body 35 is mounted with a battery 37 (see FIG. 3) for supplying drive power to the actuator of each leg unit 30 and a control device 300 (see FIG. 3) that supplies power from the battery 37 to the actuators and controls walk and the like by the leg units 30. Details of control about the working body unit 3 by the control device 300 will be described later.

Furthermore, in the flying robot 1, the flying body unit 2 and the working body unit 3 are configured so as to be capable of being mutually connected and disconnected. Specifically, as illustrated in FIG. 2A, in the working body unit 3, a working-side connector 36 enabling connection with and disconnection from the flying body unit 2 is provided on a top of the working-side body 35. Further, as illustrated in FIG. 2B, in the flying body unit 2, a flying-side connector 26 enabling connection with and disconnection from the working body unit 3 is provided on a bottom of the flying-side body 25. The flying-side connector 26 and the working-side connector 36 are provided with mechanical connection mechanisms for mechanically holding and fixing each other and electrical connection mechanisms for enabling giving and receiving of control signals, power and the like between the flying body unit 2 and the working body unit 3 in a state in which the flying robot 1 is formed by connection. As for disconnection between the flying-side connector 26 and the working-side connector 36, the disconnection between the flying body unit 2 and the working body unit 3 is realized by releasing the connection states by the mechanical connection mechanisms and the electrical connection mechanisms, respectively, and the flying body unit 2 flying by the propulsion units 23 being driven.

Note that, in the flying robot 1, connection between the flying body unit 2 and the working body unit 3 is not limited to a particular counterpart. In other words, the flying body unit 2 can be arbitrarily or selectively connected with each of working body units 3 having different work manipulators via mutual connection units and, after that, release the connection to be disconnected. Therefore, the mechanical connection mechanisms and the electrical connection mechanisms of the flying-side connector 26 and the working-side connector 36 are formed in forms common to the flying-side connector 26 and the working-side connector 36.

<Control Unit of the Flying Robot 1>

Next, controllable configurations of the flying body unit 2 and the working body unit 3 that the flying robot 1 has will be described based on FIG. 3. FIG. 3 is a block diagram illustrating each functional unit included in each of the flying body unit 2 and the working body unit 3. The flying body unit 2 has the control device 200 to perform flight control and the like about flight. The control device 200 is a computer having a processor and a memory, and has a flight control unit 210, a connection control unit 211 and a charge control unit 212 as functional units. Each functional unit is formed by a predetermined control program being executed in the control device 200.

The flight control unit 210 is a functional unit that, when the flying body unit 2 flies alone and when the flying body unit 2 is connected with the working body unit 3 and flies as the flying robot 1, controls the propulsion units 23 to generate propulsion for the flight. The flight control unit 210 controls the propulsion of the six propulsion units 23 based on environmental information related to a flight state of the flying body unit 2 and the like. As the environmental information, information about an angular speed of the flying body unit 2 detected by a gyro sensor corresponding to the three axes not illustrated (the yaw axis, the pitch axis and the roll axis), an inclination of the flying body unit 2 detected by the acceleration sensor corresponding to the above three axes not illustrated and the like can be given as an example. Using the environmental information acquired from these sensors, the flight control unit 210 feedback-controls the inclination of the flying body unit 2 and the like to be in a state suitable for the flight of the flying body unit 2 and the like. Furthermore, the environmental information may include an azimuth, which is an orientation of the flying body unit in an absolute coordinate system when an orientation of the earth's axis is used as a reference, and the azimuth can be detected by an azimuth sensor.

In the case of causing the flying body unit 2 and the like to move forward, backward, left or right, the flight control unit 210 decreases the number of rotations of the actuator 22 of propulsion units 23 in a travel direction and increases the number of rotations of actuator 22 of propulsion units 23 on a side opposite to the travel direction, and, thereby, the flying body unit 2 and the like are in a posture of leaning forward relative to the travel direction and travels in a desired direction. Further, in the case of causing the flying body unit 2 and the like to rotationally move, the flight control unit 210 performs output in a rotation direction of the propellers 21 based on a rotation direction of the flying body unit 2 and the like. For example, in the case of causing the flying body unit 2 and the like to rotate right, the flight control unit 210 decreases output of actuators 22 corresponding to propellers 21 rotating right and increases output of actuators 22 corresponding to propellers 21 rotating left.

Next, the connection control unit 211 is a functional unit that executes connection/disconnection control of connecting the flying body unit 2 and the working body unit 3 and releasing the connection state to disconnect the flying body unit 2 and the working body unit 3 in cooperation with a connection control unit 311 on the working body unit 3 side to be described later. When the flying body unit 2 connects with the working body unit 3 via the respective connectors 26 and 36 for connection, the connection control unit 211 on the flying body unit 2 side confirms a position of the working body unit 3 using an imaging result by an image sensor 29 that the flying body unit 2 has, and judges whether or not the working-side connector 36 of the working body unit 3 is in a posture preferable for connection relative to the flying-side connector 26 of the flying body unit 2.

The image sensor 29 is a monocular camera or a stereo camera. The image sensor 29 may be a color camera, a monochrome camera or a camera for wavelengths other than wavelengths of visible lights (for example, an infrared camera or a UV camera). For example, a plurality of laser emission sources are arranged on the working-side connector 36 on the working body unit 3 side. By the image sensor 29 imaging a group of bright spots of the laser emission sources, the connection control unit 211 can grasp a position and posture of the working-side connector 36. Furthermore, the image sensor 29 can measure a depth in its imaging direction, and, thereby, the connection control unit 211 can control approach of the flying body unit 2 based on a distance of the flying body unit 2 relative to the working-side connector 36 of the working body unit 3. Then, if the posture is preferable, the connection control unit 211 causes the flying body unit 2 to approach the working body unit 3 via the flight control unit 210 and causes their mutual connectors 26 and 36 for connection to be in contact with each other to execute mechanical and electrical connection.

On the other hand, if the working-side connector 36 of the working body unit 3 is not in the posture preferable for connection, the connection control unit 211 issues an instruction to adjust the posture of the working-side connector 36, to the connection control unit 311 on the working body unit 3 side via a communication unit 28 on the flying body unit 2 side and a communication unit 38 on the working body unit 3 side. When the flying body unit 2 and the working body unit 3 are connected by their mutual connectors 26 and 36 for connection, the communication unit 28 and the communication unit 38 are in a state in which wired communication is enabled between the communication unit 28 and the communication unit 38 by the electrical connection mechanisms of both connectors. On the other hand, when the flying body unit 2 and the working body unit 3 are in a state of not being connected, and both are at positions near to each other, the communication unit 28 and the communication unit 38 can perform wireless communication at a short distance (for example, about 5 m) using a predetermined wireless communication standard. In the present embodiment, data communication by the Bluetooth (registered trademark) Low Energy standard (hereinafter referred to as BLE) is performed. BLE is a low-power communication standard by Bluetooth and has a characteristic that communication can be started at once by detecting counterparts without requiring pairing between apparatuses. In addition, NFC (Near Field Communication), UWB (Ultra Wideband), WiFi (registered trademark) and the like can also be used. Furthermore, when the distance between the flying body unit 2 and the working body unit 3 is so long that the above short-distance communication cannot be performed, each of the communication unit 28 and the communication unit 38 can perform wireless communication with an external communication destination using a mobile communication service such as 3G (3rd Generation) and LTE (Long Term Evolution).

The charge control unit 212 is a functional unit that, when the flying body unit 2 and the working body unit 3 are connected, controls power supply from the battery 37 of the working body unit 3 to the battery 27 of the flying body unit 2 in cooperation with a charge control unit 312 on the working body unit 3 side to be described later. The power supply control will be described later based on FIG. 6. The charge control unit 212 also monitors remaining electric energy (SOC: State of Charge) of the battery 27 of the flying body unit 2.

Next, functional units on the working body unit 3 side will be described. The working body unit 3 has the control device 300 to perform predetermined work by the work manipulator, that is, walking work by the leg units 30 in the case of the present embodiment. The control device 300 is a computer having a processor and a memory, and has a walk control unit 310, the connection control unit 311 and the charge control unit 312 as functional units. Each functional unit is formed by a predetermined control program being executed in the control device 300.

The walk control unit 310 is a functional unit that, when the working body unit 3 walks alone and when the flying body unit 2 is connected with the working body unit 3 and walks as the flying robot 1, controls the actuators provided for the two leg units 30 for the walk. The walk control unit 310 controls the leg units 30 based on environmental information related to a walking state of the working body unit 3 and the like. As the environmental information, information about an angular speed of the working body unit 3 detected by a gyro sensor corresponding to the three axes not illustrated (the yaw axis, the pitch axis and the roll axis) and an inclination of the working body unit 3 detected by an acceleration sensor corresponding to the above three axes not illustrated can be given as an example. The actuator provided for each joint of the leg units 30 is provided with an encoder (not illustrated) that detects a quantity of state about a rotational state of the actuator (a rotational position, a rotational speed and the like of the rotation axis of the actuator). Based on the quantity of state of each actuator detected by the encoder of the actuator, the walk control unit 310 servo-controls the actuators of the leg units 30 so that the inclination and the like of the working body unit 3 are in states suitable for walking.

As described above about the connection control unit 211 on the flying body unit 2 side, the connection control unit 311 is a functional unit that executes the connection/disconnection control of connecting the flying body unit 2 and the working body unit 3 and releasing the connection state to disconnect the flying body unit 2 and the working body unit 3 in cooperation with the connection control unit 211. When, in a case where the working-side connector 36 of the working body unit 3 is not in a posture preferable for connection, receiving an instruction to adjust the posture of the working-side connector 36 from the connection control unit 211, the connection control unit 311 controls the leg units 30 via the walk control unit 310 to adjust the posture of the working-side connector 36 relative to the flying body unit 2. Note that the amount of adjustment is based on a posture shift of the working-side connector 36 acquired by the connection control unit 211 via the image sensor 29.

<Modification 1 of Flying Robot 1>

Here, a first modification of the flying robot 1 will be described based on FIG. 4A. Note that the flying robot 1 illustrated in FIG. 4A is in a state in which the flying body unit 2 and the working body unit 3 are connected via their mutual connectors for connection. The flying robot 1 illustrated in FIG. 4A and the flying robot 1 illustrated in FIG. 1 are different in the configuration of the working body unit 3. Therefore, description of the flying body unit 2 common to both flying robots 1 is omitted.

The working body unit 3 of the flying robot 1 illustrated in FIG. 4A has one arm unit 40 corresponding to the work manipulator configured to be capable of executing predetermined work. Note that, for the arm unit 40, grasping work of grasping a target object is assumed as predetermined work. The arm unit 40 has an end effector 41 for grasping a target object, a wrist unit 42 that is relatively rotatably connected with the end effector 41 via a joint, a first link unit 43 that is relatively rotatably connected with the wrist unit 42 via a joint, a second link unit 44 that is relatively rotatably connected with the first link unit 43 via a joint, and a plurality of actuators (not illustrated) that drive-control rotation of the joints. A rotation direction of each of these joints is designed according to the target object grasping work. As an example, the joint between the end effector 41 and the wrist unit 42 is configured to be capable of rotating around the yaw axis; a joint between the wrist unit 42 and the first link unit 43 is configured to be capable of rotating around the roll axis; and the joint between the first link unit 43 and the second link unit 44 is configured to be capable of rotating around the pitch axis. Note that the configuration of each joint is not limited to such an aspect.

The second link unit 44 is relatively rotatably connected with a working-side body 45 that the working body unit 3 has, via a predetermined joint. This predetermined joint is configured to be capable of rotating around the yaw axis and the pitch axis. The predetermined joint may also be configured to be capable of rotating around the roll axis. As for the arm unit 40 connected with the working-side body 45, grasping work as predetermined work is realized by actuators for driving the joints, which are provided inside the arm unit 40 being controlled. Since control about grasping a target object is a publicly known technique, detailed description thereof will be omitted in the present specification. Note that the working-side body 45 is also provided with components corresponding to the working-side connector 36, the battery 37, the communication unit 38 and the control device 300 described above. By a control device corresponding to the control device 300, control for connection/disconnection between the flying body unit 2 and the working body and control for power supply from the battery of the working body unit 3 to the battery 27 of the flying body unit 2 are also performed in addition to the grasping control by the arm unit 40 described above.

<Modification 2 of Flying Robot 1>

Here, a second modification of the flying robot 1 will be described based on FIG. 4B. The flying robot 1 illustrated in FIG. 4B and the flying robot 1 illustrated in FIG. 1 are mainly different in the configuration of the working body unit 3. Description of the flying body unit 2 common to both flying robots 1 is omitted.

Here, as for the flying robot 1 illustrated in FIG. 4B, the two leg units 30 are attached to the working-side body 35 similarly to the flying robot 1 illustrated in FIG. 1, and, furthermore, the one arm unit 40 is attached to the working-side body 35 similarly to the flying robot 1 illustrated in FIG. 4B. In other words, the flying robot 1 of the present modification is capable of executing grasping work of grasping a target object by the arm unit 40 as predetermined work in addition to the above-described walking work by the leg units 30. Note that the walking work and the grasping work are as described above. Further, the working-side body 35 of the present modification is also provided with components corresponding to the working-side connector 36, the battery 37, the communication unit 38 and the control device 300 described above. By a control device corresponding to the control device 300, control for connection/disconnection between the flying body unit 2 and the working body and control for power supply from the battery of the working body unit 3 to the battery 27 of the flying body unit 2 are also performed in addition to the grasping control by the arm unit 40 described above.

The flying robot 1 configured as described above can execute both of walking work by the leg units 30 and grasping work by the arm unit 40 as described above. Both of the walking work and the grasping work may be simultaneously performed or alternately performed. Further, the flying robot 1 is capable of performing the grasping work by the arm unit 40 while flying by propulsion of the propulsion units 23 of the flying body unit 2 (that is, in a state in which the leg units 30 have not grounded). Alternatively, even in a place where footing is bad, and the body unit of the flying robot 1 is difficult to support only by the leg units 30, the flying robot 1 can be arranged in the place while a load on the propulsion units 23 is being suppressed by driving the propulsion units 23 in a state in which the leg units 30 have grounded, and, for example, the flying robot 1 can perform predetermined grasping work by the arm unit 40 there.

<Work Execution Control>

Here, work execution control to execute predetermined work by the flying robot 1 will be described based on FIG. 5. The work execution control is realized by a predetermined control program being executed in the flying body unit 2 and the working body unit 3. Note that, in the present embodiment, it is assumed that the flying body unit 2 before the flying robot 1 is formed flies to a work place where execution of predetermined work is requested, connects with the working body unit 3 to become the flying robot 1 there, and carries out the requested work.

First, at S101, the flying body unit 2 receives an instruction of predetermined work from the outside via the communication unit 28. The instruction includes information about a place where the predetermined work is to be performed, information about the predetermined work to be executed at the work place and information identifying a working body unit 3 corresponding to the predetermined work. The instruction may include information about a plurality of kinds of predetermined work and identification information about working body units 3 corresponding thereto. Note that, in the present embodiment, it is assumed that two pieces of information about walking work and target object grasping work are included in the instruction, and the walking work and the grasping work are to be executed in that order. When receiving the instruction, the flying body unit 2 flies and moves to the work place based on the information about the work place included in the instruction (a process of S102). This flight is executed by the flight control unit 210. Note that, in the present embodiment, it is assumed that the working body unit 3 corresponding to the predetermined work is arranged at the work place.

At the next S103, the flying body unit 2 detects the target working body unit 3 based on the identification information included in the instruction, and connects with the working body unit 3. Specifically, in order to find the target working body unit 3 using a short-distance communication function of the communication unit 28, the flying body unit 2 which has flied and moved to the work place by the process of S102 performs polling including identification information corresponding to the target working body unit 3. At this time, when receiving the polling, the target working body unit 3 replies in response thereto. As a result, the flying body unit 2 can detect the target working body unit 3. After the working body unit 3 is detected, the connection/disconnection control described above is performed so that the flying-side connector 26 of the flying body unit 2 is connected with the working-side connector 36 of the working body unit 3. The series of processes of S103 are executed by the connection control unit 211 of the flying body unit 2 and the connection control unit 311 of the working body unit 3 in cooperation with each other.

When the flying body unit 2 and the working body unit 3 are connected by the process of S103, the flying robot 1 is formed. Then, in a process of S104, the predetermined work by a work manipulator mounted on the connected working body unit 3 is started. Then, at S105, it is judged whether or not the predetermined work has ended. As for this end judgment, when the specified predetermined work is ended by the work manipulator of the working body unit 3, an end notification about that is sent from the working body unit 3 to the flying body unit 2, and it is judged by the control device 200 that the work has ended. Then, if a positive judgment is made at S105, the flow proceeds to S106. If a negative judgment is made, the judgment process of S105 is performed again.

Then, at S106, with the predetermined work using the work manipulator of the connected working body unit 3 having ended, the connection between the flying-side connector 26 and the working-side connector 36 is released, and the flying body unit 2 is disconnected from the working body unit 3. This disconnection process is executed by the connection control unit 211 and the connection control unit 311 in cooperation with each other. When the process of S106 ends, the flow proceeds to S107.

At S107, it is judged whether or not all kinds of predetermined work included in the work instruction received at S101 have ended. In other words, if the control device 200 of the flying body unit 2 has received work end notifications about all the kinds of predetermined work from the working body unit 3, it means that all the kinds of predetermined work have ended. In the present embodiment, the walking work and the grasping work are to be performed according to the work instruction as described above. Therefore, if the control device 200 has received end notifications about these two kinds of predetermined work, a positive judgment is made at S107, and the present control is ended. On the other hand, if the control device 200 have not received the end notifications about the two kinds of predetermined work, a negative judgment is made at S107, and the processes at and after S103 are repeated again.

According to the work execution control described above, when arriving at a work place, the flying body unit 2 that has received a work instruction connects with a working body unit 3 provided with leg units 30 as illustrated in FIG. 1 as a work manipulator first, and executes walking work as predetermined work in the case of the present embodiment. In the walking work, for example, the flying robot 1 can enter a place where it is difficult to fly and can perform collection of target information and the like using a sensor, a camera and the like not illustrated in such a place.

Furthermore, when the walking work ends, the flying body unit 2 is disconnected from the working body unit 3 that is currently connected, connects with another working body unit 3 that is provided with an arm unit 40 as illustrated in FIGS. 4A and 4B as a work manipulator next, and executes grasping work as predetermined work. In the grasping work, while the flying robot 1 is caused to fly by the flying body unit 2, a target object is recognized, using a camera or the like not illustrated, and grasping of the target object is performed.

According to the flying robot 1 configured so that the flying body unit 2 and the working body unit 3 can be connected and disconnected as described above, it is possible to, by the flying body unit 2 selectively connecting with the working body unit 3, preferably switch content of predetermined work that can be executed by the flying robot 1. Especially, by a various types of working body units 3 being arranged at a work place as described above, it is possible to smoothly switch the content of work that can be executed by the flying robot 1 at the work place, and, thereby, it becomes possible to efficiently realize a various kinds of work. Note that, when the last predetermined work is ended, the flying body unit 2 and the working body unit 3 do not necessarily have to be disconnected.

<Charge Control>

Next, charge control executed in the flying robot 1 will be described based on FIG. 6. The charge control is control executed by the charge control unit 212 and the charge control unit 312 when the flying body unit 2 and the working body unit 3 are connected, and is control about charging of the battery 27 of the flying body unit 2. As shown in the work execution control described above, the flying body unit 2 is sequentially connected with and disconnected from a plurality of working body units 3 according to predetermined work scheduled to be executed, and has to fly therefor. Thus, much power is required. However, if the size of the battery 27 is unnecessarily increased, there is a possibility that flight ability of the flying body unit 2 is hindered. Therefore, in order to secure a series of operations of the flying body unit 2, the charge control is thought to be useful.

Details of the charge control will be described below. First, at S201, it is judged whether or not the flying body unit 2 and the working body unit 3 have been connected. For example, by the connection control unit 211 and the connection control unit 311 being electrically and wiredly connected when the flying body unit 2 and the working body unit 3 are connected via the connectors 26 and 36 for connection, it can be judged that both have been connected. If a positive judgment is made at S201, the flow proceeds to S202. If a negative judgment is made, the present control is ended.

At S202, it is judged on the flying body unit 2 side whether or not it is necessary to charge the battery 27. Specifically, if the SOC of the battery 27 monitored by the charge control unit 212 is below a predetermined threshold (the threshold is, for example, 30% when full charge is indicated by 100%), it can be judged that it is necessary to charge the battery 27. If a positive judgment is made at S202, the flow proceeds to S203. If a negative judgment is made, the present control is ended.

Next, it is judged on the working body unit 3 side whether or not it is possible to supply power from the battery 37 to the battery 27. The working body unit 3 to which the flying body unit 2 is connected needs to perform predetermined work by the leg units 30 or the arm unit 40. Therefore, in this judgment, if the predetermined work has not ended yet, the above judgment is made based on the SOC of the battery 37 monitored by the charge control unit 312 in consideration of electric energy required to end the predetermined work. Note that, if the predetermined work has already ended, power supply to the battery 27 becomes possible if electric energy remains in the battery 37. If a positive judgment is made at S203, the flow proceeds to S204. If a negative judgment is made, the present control is ended.

Next, at S204, power supply from the battery 37 of the working body unit 3 to the battery 27 of the flying body unit 2 is started. At this time, it is desired that power supply is performed so that the SOC of the battery 27 is as close to 100% as possible, as far as processes (a communication process with the outside and the like) required in the working body unit after execution of the predetermined work or charging in the working body unit 3 are not hindered.

By the above charge control being performed, the flying body unit 2 can receive power supply from the working body unit 3, and it is possible to maintain the flight ability of the flying body unit 2 to be favorable while the capacity of the battery 27 is made relatively small. This is useful to realize the above work execution control when the flying body unit 2 is required to be sequentially connected with and disconnected from a plurality of working body units 3 according to predetermined work scheduled to be executed, and fly therefor.

DESCRIPTION OF THE REFERENCE NUMERALS

1 Flying robot
2 Flying body unit
3 Working body unit
21 Propeller
22 Actuator
23 Propulsion unit
25 Flying-side body
26 Flying-side connector
27 Battery
30 Leg unit
35 Working-side body
36 Working-side connector
37 Battery
40 Arm unit

The invention claimed is:

1. A flying robot comprising:
   a flying body unit;
   a propulsion portion comprising a plurality of propulsion units configured to cause propulsion to occur by driving rotor blades, the plurality of propulsion units being provided on the flying body unit;
   a working body unit;
   a manipulator unit configured to be capable of executing predetermined work and comprising one or more work manipulators provided on the working body unit; and
   connection units provided on the working body unit and the flying body unit so as to enable the flying body unit to be connected with and disconnected from the working body unit by flying with the plurality of propulsion units;
   wherein the flying robot executes the predetermined work by the work manipulators in a state in which the working body unit and the flying body unit are connected at the connection units; and
   the flying body unit detects and connects the working body unit corresponding to the predetermined work from one or more work manipulators while flying based on an instruction of the predetermined work.

2. The flying robot according to claim 1, wherein
   the one or more work manipulators are arm units configured to be capable of grasping a target object; and
   the flying robot grasps the target object by the arm units as the predetermined work while flying by the propulsion portion in the state in which the working body unit and the flying body unit are connected at the connection units.

3. The flying robot according to claim 1, wherein
   the plurality of work manipulators are leg units configured to be capable of supporting the working body unit; and
   the flying robot executes walk control on a walking surface by the leg units as the predetermined work without flying by the propulsion portion, in the state in which the working body unit and the flying body unit are connected at the connection units.

4. The flying robot according to claim 1, wherein
   the flying body unit comprises a flying-side secondary battery configured to supply power for driving the plurality of propulsion units and capable of being supplied with power from outside;
   the working body unit comprises a working-side battery configured to supply power for driving the one or more work manipulators; and
   when the working body unit and the flying unit body are connected at the connection units, power supply from the working-side battery to the flying-side secondary battery is performed.

* * * * *